(12) United States Patent
Brown et al.

(10) Patent No.: US 7,656,184 B2
(45) Date of Patent: Feb. 2, 2010

(54) DETECTING COUNTERFEIT PRODUCTS

(75) Inventors: David A. Brown, San Jose, CA (US);
Dominick J Attisani, Cameron Park, CA (US)

(73) Assignee: Intel Corporation, Santa Clara, CA (US)

( * ) Notice: Subject to any disclaimer, the term of this patent is extended or adjusted under 35 U.S.C. 154(b) by 181 days.

(21) Appl. No.: 11/322,677

(22) Filed: Dec. 30, 2005

(65) Prior Publication Data

US 2007/0152703 A1    Jul. 5, 2007

(51) Int. Cl.
*H03K 19/00* (2006.01)

(52) U.S. Cl. .............................. 326/8; 326/38
(58) Field of Classification Search ...................... 326/8, 326/9, 37, 38; 705/57–59
See application file for complete search history.

(56) References Cited

U.S. PATENT DOCUMENTS

| 5,440,244 | A | * | 8/1995 | Richter et al. ................. 326/37 |
| 6,944,083 | B2 | * | 9/2005 | Pedlow, Jr. ............... 365/225.7 |
| 2003/0122578 | A1 | * | 7/2003 | Masui et al. .................. 326/39 |
| 2005/0259484 | A1 | * | 11/2005 | Newell ....................... 365/195 |
| 2007/0050622 | A1 | * | 3/2007 | Rager et al. ................. 713/168 |
| 2007/0073743 | A1 | * | 3/2007 | Bammi et al. ............... 707/100 |
| 2007/0109124 | A1 | * | 5/2007 | Park et al. ................. 340/572.1 |

FOREIGN PATENT DOCUMENTS

| EP | 1006447 A2 | 6/2000 |
| WO | WO 97/63240 | 10/1997 |

OTHER PUBLICATIONS

Using the PMCIA standard to provide I/O for your VMEbus system, Karamooz, Saeed, 1977, VMEbus Systems, vol. 12.*
International Search Report & Written Opnion from related PCT Application Serial No. PCT/US2006/047715 Feb. 15, 2008, 10 pgs.

* cited by examiner

*Primary Examiner*—Don P Le
(74) *Attorney, Agent, or Firm*—Robert D. Anderson

(57) ABSTRACT

In some embodiments an indication of an intended use of a logic device is stored in a register of the logic device, and any further programming of the register is prevented. Other embodiments are described and claimed.

30 Claims, 5 Drawing Sheets

US 7,656,184 B2

DETECTING COUNTERFEIT PRODUCTS

TECHNICAL FIELD

The inventions generally relate to detecting counterfeit products.

BACKGROUND

In some cases, a company such as Intel Corporation makes components (for example, computer chips) that are sold individually as well as included on board level and/or system level products that incorporate one or more of the components that the company sells individually. In such cases the components are sometimes diverted from legitimate customer system design implementations, through the "open market", to illicit counterfeiting operations that counterfeit proprietary and trademark branded system and/or board-level designs of that company. Therefore, a need has arisen to separate and distinguish components sold and shipped to legitimate OEMs (Original Equipment Manufacturers) from components built for use on branded company systems intended for the company branded or company proprietary boards and/or systems.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Figure 1:
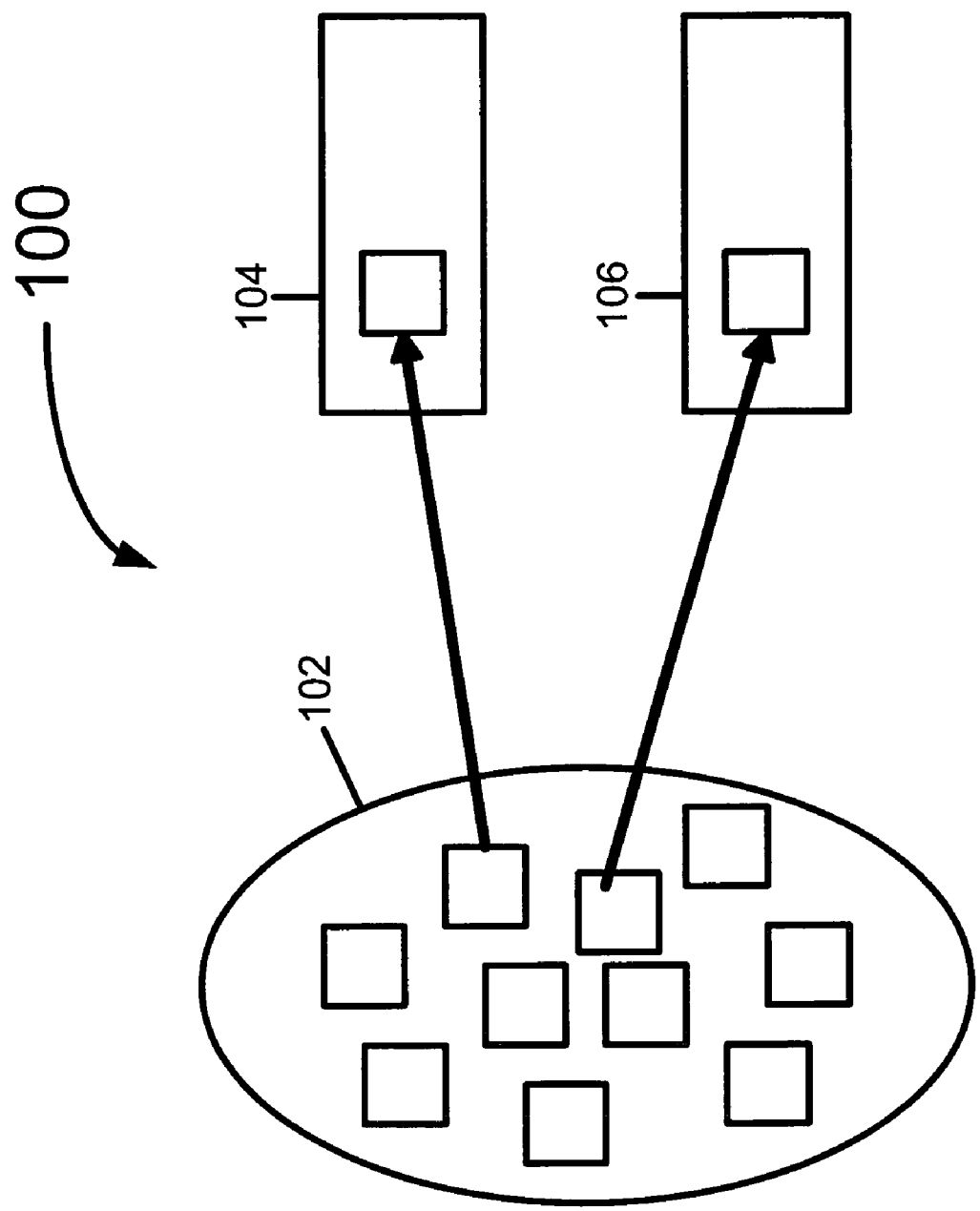
FIG. 1 illustrates sorting of logic devices according to some embodiments of the inventions.

Some embodiments of the inventions relate to detecting counterfeit products.

In some embodiments an indication of an intended use of a logic device is stored in a register of the logic device, and any further programming of the register is prevented.

In some embodiments a logic device includes a register indicating an intended use of the logic device.

In some embodiments an indication of an intended use of a logic device is read from a register of the logic device. A determination is made whether the logic device is included in a counterfeit product in response to the read indication.

In some embodiments a programming circuit stores in a register of a logic device an indication of an intended use of the logic device and prevents any further programming of the register.

One way to attempt to detect counterfeit board and/or system level products is to incorporate an item in the Bill of Materials (BOM) that is only available to licensed manufacturers of the branded and/or trademarked product. This item incorporated into the BOM can incorporate a proprietary security technology that is not readily available on the open market. Special equipment could be used to detect the presence or absence of the security technology feature. However, distribution of the special detection equipment is expensive, and the security technology can become compromised when the wrong people gain custody of the special detectors. The detectors may also be expensive or time consuming to use, thus limiting the effectiveness of the security technology. Many counterfeit products might escape detection in this type of solution since too few people have access to and know how to use the detection equipment.

One alternative is for a company (for example, Intel Corporation) to use a logic device only on branded boards (or systems) of that company and never allow open market access to that specific logic device. In this model, the logic device of the company becomes proprietary security technology. No additional detection equipment is necessary beyond, for example, a small web-based identification tool available on the internet that is a tool authenticating the legitimacy of the company branded or proprietary design. Only legitimate (that is, internal and/or company branded) system designs would have access to this logic device and permit the appropriate hardware-software "handshake". However, in this case some flexibility is missing since the company would not be able to provide this logic device for sale (for example, on the "open market") without the entire branded system and/or board.

According to some embodiments a logic device on a board-level product is interrogated to determine if that board-level product is counterfeit or if the board-level product was manufactured by a trademark protected brand owner or a licensed subcontractor of the trademark protected brand owner (for example, using software).

According to some embodiments multiple brand owners can use common logic devices and still distinguish trademark branded board-level products of similar or identical function from one another.

According to some embodiments a logic device includes a software visible register of one or more bits in length implemented, for example, using a one-time programmable circuit.

According to some embodiments a manufacturing and distribution protocol programs a unique pattern into a software visible register of a logic device for each trademark protected brand owner and insures that each brand owner has control over the distribution of the logic device after their pattern is written into the register of the logic device.

According to some embodiments a manufacturer offers logic devices of identical functionality and performance to more than one customer. The logic devices include a feature where a small static and stand-alone software program can in-situ distinguish logic devices shipped to one customer from logic devices shipped to anyone else. It is possible to distinguish logic devices using a software visible serial number (for example, an Ethernet device MAC address), but when using serial numbers the software must access a central database and is therefore neither stand-alone nor static, since the central database may be constantly updated.

According to some embodiments the unauthorized use of trademarks and/or brands on counterfeit board-level products incorporating logic devices may be tracked, prohibited, and/or limited. According to some embodiments, tamper-resistant software auditing tools may be used that help detect and deter counterfeit products at all links in the re-distribution chain of sale.

FIG. 1 illustrates a block diagram 100 representing sorting of a population 102 of identical logic devices. Some of the population 102 of identical logic devices are sorted into a group of branded board-level products 104 that are intended by the manufacturer of the logic devices to be included in branded board-level products (for example, with a brand of that manufacturer and/or with the brand of an approved subcontractor). The rest of the population 102 of identical logic devices are sorted into a group of counterfeit board-level products 106 (for example, that are intended by the manufacturer of the logic devices to be sold individually on the open market). Available software cannot generally distinguish between authentic logic devices that are intended by the manufacturer to be in branded board-level products from logic devices that are not intended by the manufacturer to be in branded board-level products (that is, "counterfeit board-level products") without being expensive and less accurate (for example, using forensic analysis).

Figure 2:
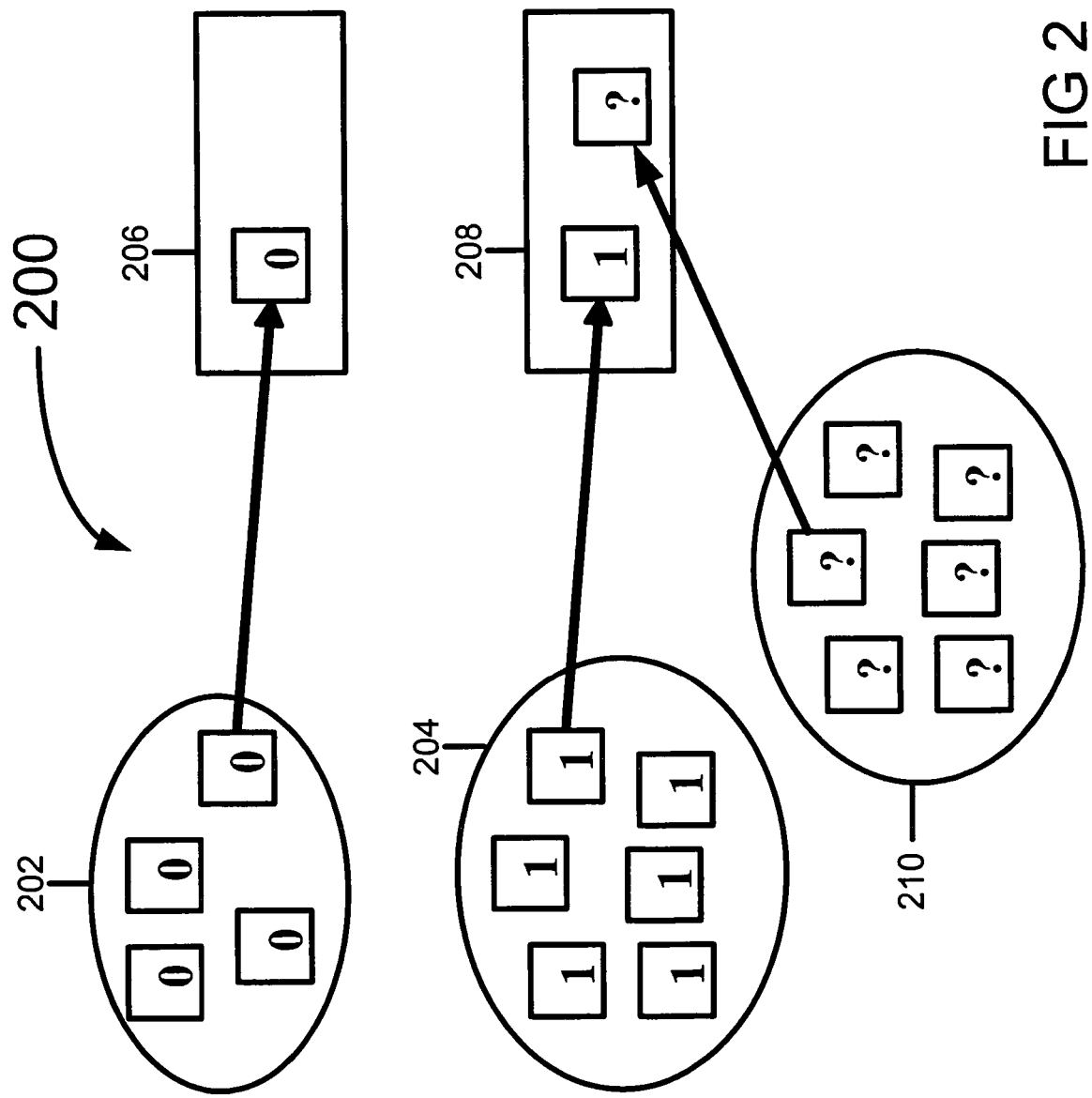
FIG. 2 illustrates sorting of logic devices according to some embodiments of the inventions.

FIG. 2 illustrates a block diagram 200 representing sorting of logic devices according to some embodiments. According to some embodiments, populations of logic devices are segregated by a value in a register in the logic devices (for example, a brand protection register). In FIG. 2, population 202 of logic devices include devices that have one value in a special register such as a brand protection register (value "0" in FIG. 2), and population 204 of logic devices include a different value in their special register such as a brand protection register (value "1" in FIG. 2). Population 202 and population 204 of logic devices are distinguished by software between authentic branded board-level products 206 (for example, internal use only and/or controlled distribution products) and counterfeit board-level products 208 (for example, open market use and/or open distribution products). The software can distinguish between authentic and counterfeit board-level units by viewing the contents of the special register (for example, brand protection register) of each of the logic units, making fraud visible to savvy users.

According to some embodiments FIG. 2 additionally illustrates a population 210 of logic devices that includes devices that have no value (or some ambiguous value) in a special register such as a brand protection register (value "?" in FIG. 2). According to some embodiments software further distinguishes these types of logic devices as counterfeit products 208 (for example, a 100% counterfeited component such as a logic device that had no origination from the manufacturing company factory). In such a scenario the counterfeit component has, for example, neither a "0" nor a "1" in a register visible to detection software, and, for example, reads as a "?" (a failure). According to some embodiments such a failed device can be declared as contraband along with the counterfeit board-level products 208 illustrated in FIG. 2. According to some embodiments such a failed device can be declared as contraband and placed into a separate counterfeit category other than along with the counterfeit board-level products 208. The brand and consumer can then be further protected via an appropriate advisory notification either the same as a notification for counterfeit board-level products 208 and/or slightly different than a notification for counterfeit board-level products 208.

Figure 3:
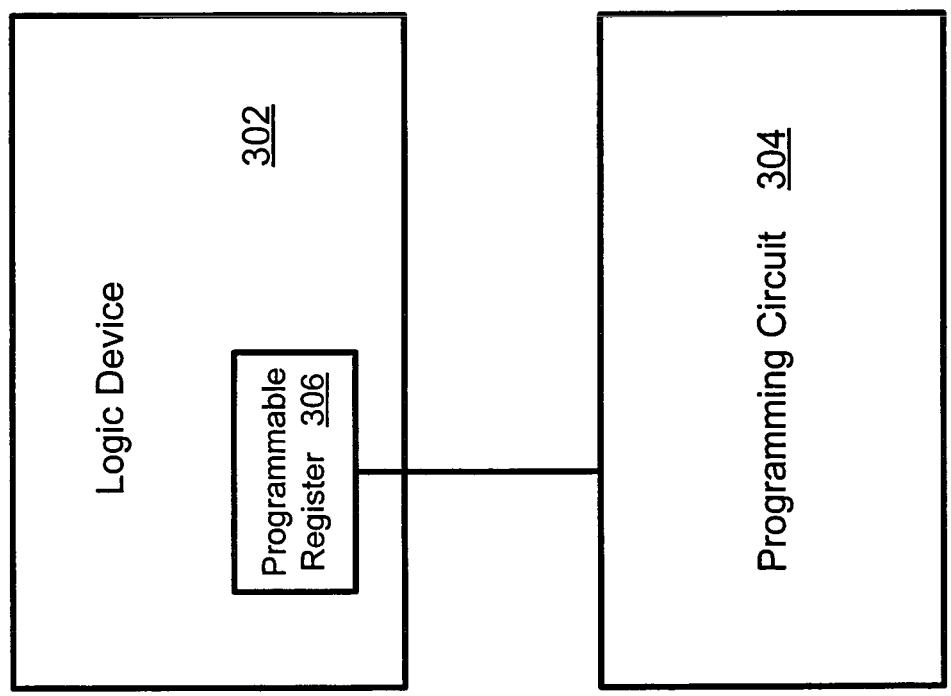
FIG. 3 illustrates a block diagram according to some embodiments of the inventions.

FIG. 3 illustrates a block diagram 300 which represents programming of logic devices according to some embodiments. Block diagram 300 includes a logic device 302 being programmed and a programming circuit 304. Logic device 302 includes a programmable register 306 (for example, a brand protection register). According to some embodiments, register 306 may be one bit. According to some embodiments, register 306 may be any number of bits. According to some embodiments, register 306 may contain an adjustable number of bits.

According to some embodiments programmable register 306 is a one-time programmable register added to logic device 302 that identifies an intended use of the logic device (for example, identifies that the logic device is intended to be included in a board-level and/or system-level design of the manufacturer of the logic device and/or of subcontractors, customers, licensees, etc. of the manufacturer of the logic device or identifies that the logic device is intended to be sold individually). According to some embodiments, programmable circuit 304 is any circuit that can program a logic device and/or a register. Programmable circuit 304 may be implemented in hardware, software, and/or firmware, for example.

According to some embodiments programmable register 306 is a one-time programmable register. According to some embodiments populations of otherwise identical logic devices may be segregated and/or distinguished (for example, using software). According to some embodiments, by programming distinct patterns into a register such as register 306, silicon that is shipped to factories licensed to manufacture boards branded by the company that manufactured the logic device can be identified by software (for example, software that is freely and widely distributed to any interested party). A factory that is not licensed to manufacture boards branded by the company that manufactured the logic device will not have access to logic devices programmed with the distinct pattern required of boards branded by that company. While the unlicensed factory may still be able to procure logic devices (for example, generic components) and produce a cloned board-level and/or system level product (that is a counterfeit that misrepresents the board and/or system), the counterfeit board (or system) will fail the software identification test (thus identifying the board and/or system as contraband). According to some embodiments, the same logic device as that used on the company branded boards and/or systems may be sold on the open market with different patterns programmed into the register (brand protection register). In this manner, authentic branded boards may be validated without any additional add-on security devices.

According to some embodiments, the programmable register (for example, register 306 and/or a brand protection register) is more than one bit in length. When the register is more than one bit in length, according to some embodiments each unique binary pattern can be assigned, for example, to protect a different brand and/or different trademark. Some or all of the different brands and/or different trademarks might be owned by the company that manufactured the logic device (for example, Intel Corporation), and some or all of the different brands and/or different trademarks might be owned by another company or companies (for example, one or more customers of the company that manufactured the logic device). Additional bits in the register (for example, register 306) and/or an additional register allow a manufacturer to provide the option to provide brand and/or trademark protection features to some or all of it's customers, for example. Further, the manufacturer can use this type of brand and/or trademark protection to track material leaking into the open market and potentially into the hands of board and/or system counterfeiting operations. By identifying this type of leakage, the manufacturer and/or it's customers, OEMs, licensees, etc. can determine the leak of product that may end up in the hands of counterfeiting operations.

According to some embodiments, a programming circuit (for example, circuit 304) programs each bit of a register (for example, register 306) during manufacture of a logic device (for example, logic device 302). The step of programming the register can occur anywhere in the manufacturing flow that is convenient to the manufacturer. However, according to some embodiments, once the register is programmed, populations of logic devices are segregated such that there is no mixing of brand protection patterns within each group of logic devices.

According to some embodiments, any technique may be used to program the register as long as the programming cannot be erased or altered. According to some embodiments, a program lockout feature prevents further programming of any bits once the logic device leaves the manufacturing factory.

According to some embodiments, the pattern programmed into the brand protection register must be visible to Operating System (OS) software that uses the logic device. According to some embodiments the register is addressable as a read-only location using a peripheral input/output channel structure of the system in which the logic device is installed.

According to some embodiments, the brand protection register does not impact or control any other functional features of the logic device. In such embodiments the only function of this register is to present the programmed pattern (for example, to the OS software).

According to some embodiments, the robustness of the brand protection register as a counterfeit detection technique improves with the increased complexity of the logic device incorporating the register. Highly complex logic devices are difficult to counterfeit and counterfeit logic devices can be used create an alternate source of unprogrammed brand protection registers in the open market. For example, a brand protection register is highly robust for logic devices with complexity equal to or greater than that of an Ethernet controller (or other embedded controllers).

According to some embodiments, less complex devices that have circuitry exposed to direct copying need to have augmentations to the brand protection register. For example, according to some embodiments identification protocols are implemented that use advanced encryption technology to prevent 100% component forgeries from being used to falsely identify system and/or board level clones as authentic. Such additional measures would not typically currently be necessary for components such as advanced CPUs and Ethernet and wireless enabling component designs, since their circuitry is not typically considered to be exposed to direct copying.

According to some embodiments, software used by the Operating System (OS) to display the brand protection pattern to the end user must be available to the end user from a secure source. Therefore, according to some embodiments any party wishing to validate the authenticity of a board-level and/or system-level product incorporating a logic device with a brand protection register can procure a fresh copy of the validation software from the secure source. This ensures that the software has not been corrupted by other parties attempting to counterfeit the board-level and/or system-level product.

Figure 4:
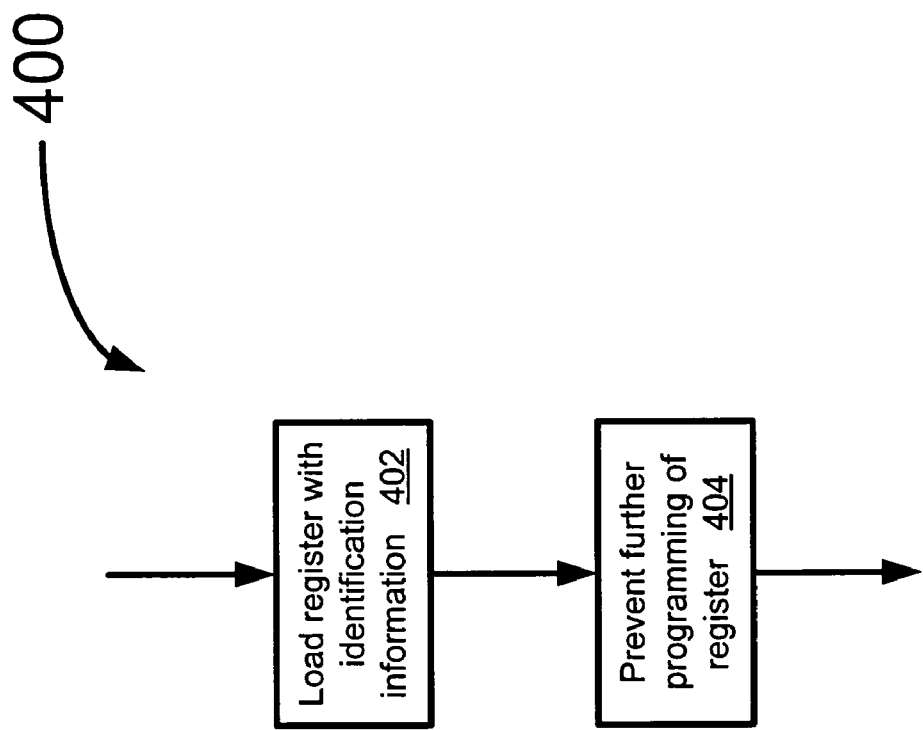
FIG. 4 illustrates a flowchart according to some embodiments of the inventions.

FIG. 4 illustrates a flowchart 400 according to some embodiments of the inventions. At box 402 a register is loaded with identification information. For example, at box 402 the register is loaded with information identifying an expected use of a logic device in which the register is located (for example, is the logic device intended to be used in a branded board-level product or sold individually on the open market). At box 404 further programming of the register is prevented (for example, so that the intended use of the logic device in branded board-level product or sale of the logic device the open market may not be changed). According to some embodiments flowchart 400 may be implemented, for example, by programming circuit 304 illustrated in FIG. 3.

Figure 5:
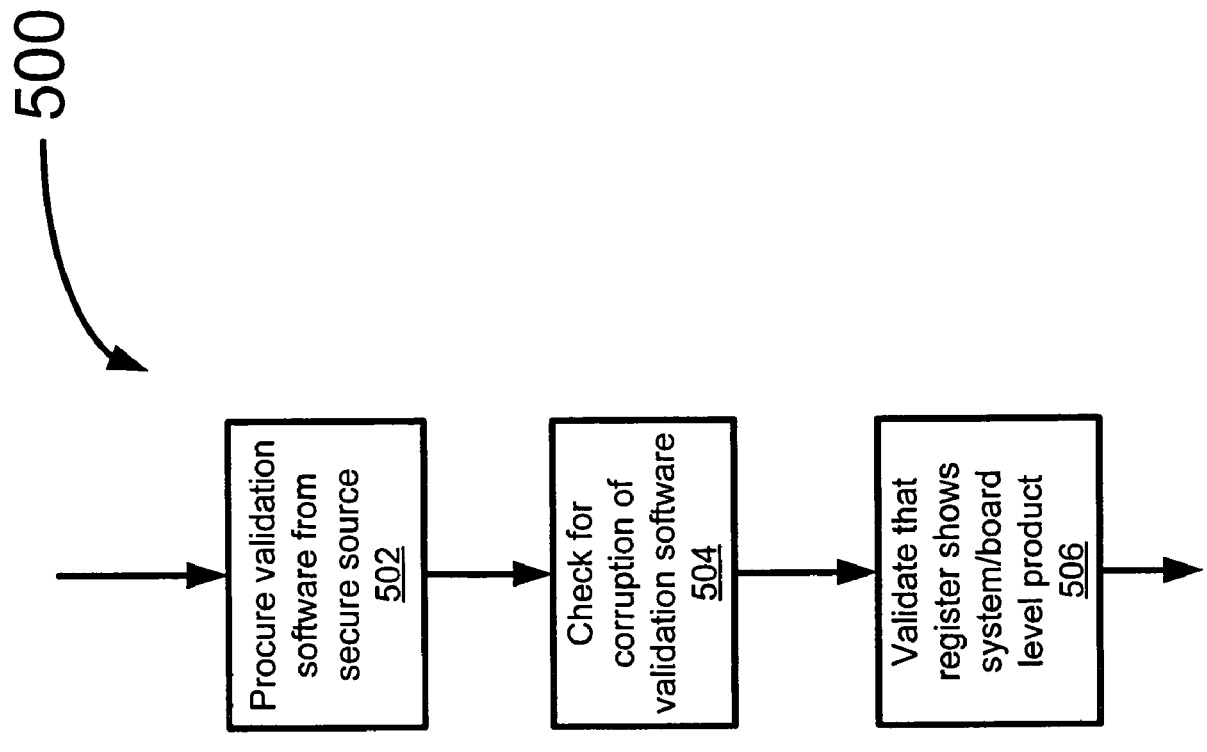
FIG. 5 illustrates a flowchart according to some embodiments of the inventions.

FIG. 5 illustrates a flowchart 500 according to some embodiments of the inventions. At box 502 validation software is procured from a secure source (for example, from the web site of the manufacturer of the logic device that is to be tested). Then at box 504 a test is performed to ensure that the validation software has not been corrupted. If the validation software has not been corrupted at 504 then a validation is made at 506 to validate that the register of the logic device identifies that the logic device was intended to be used in a branded board-level and/or system-level device, for example.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state, or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method comprising:
   storing in a register of a logic device an indication of an intended use of the logic device; and
   preventing any further programming of the register;
   wherein the intended use includes at least one of an indication that the logic device is to be sold individually and an indication that the logic device is to be included in a branded product.

2. The method of claim 1, wherein the register does not impact or control any other functional features of the logic device.

3. A method comprising:
   storing in a register of a logic device an indication of an intended use of the logic device; and
   preventing any further programming of the register;
   wherein the intended use includes at least one of an indication that the logic device is to be included in a board-level product and an indication that the logic device is to be sold individually.

4. The method of claim 3, wherein the register does not impact or control any other functional features of the logic device.

5. A method comprising:
   storing in a register of a logic device an indication of an intended use of the logic device; and
   preventing any further programming of the register;
   wherein the storing uses encryption technology.

6. The method of claim 5, wherein the register is addressable as a read-only location using a peripheral input/output channel structure.

7. The method of claim 5, wherein the register does not impact or control any other functional features of the logic device.

8. A logic device comprising:
   logic; and
   a register indicating an intended use of the logic device;
   wherein the intended use includes at least one of an indication that the logic device is to be sold individually and an indication that the logic device is to be included in a branded product.

9. The logic device of claim 8, wherein the register does not impact or control any other functional features of the logic device.

10. A logic device comprising:
    logic; and
    a register indicating an intended use of the logic device;
    wherein the intended use includes at least one of an indication that the logic device is to be included in a board-level product and an indication that the logic device is to be sold individually.

11. The logic device of claim 10, wherein the register does not impact or control any other functional features of the logic device.

12. A logic device comprising:
    logic; and
    a register indicating an intended use of the logic device;
    wherein the register includes encrypted data and wherein the register is addressable as a read-only location using a peripheral input/output channel structure.

13. The logic device of claim 10, wherein the register does not impact or control any other functional features of the logic device.

14. A method comprising:
    reading from a register of a logic device an indication of an intended use of the logic device; and
    determining whether the logic device is included in a counterfeit product in response to the reading.

15. The method of claim 14, wherein the intended use includes at least one of an indication that the logic device is to be sold individually and an indication that the logic device is to be included in a branded product.

16. The method of claim 14, wherein the intended use includes at least one of an indication that the logic device is to be included in a board-level product and an indication that the logic device is to be sold individually.

17. The method of claim 14, wherein the register does not impact or control any other functional features of the logic device.

18. The method of claim 14, wherein the reading uses encryption/decryption technology.

19. The method of claim 14, wherein the register is read as a read-only location using a peripheral input/output channel structure.

20. The method of claim 15, wherein the register does not impact or control any other functional features of the logic device.

21. The method of claim 16, wherein the register does not impact or control any other functional features of the logic device.

22. The method of claim 18, wherein the register does not impact or control any other functional features of the logic device.

23. An apparatus comprising:
    a programming circuit to store in a register of a logic device an indication of an intended use of the logic device and to prevent any further programming of the register;

wherein the intended use includes at least one of an indication that the logic device is to be sold individually and an indication that the logic device is to be included in a branded product.

24. The apparatus of claim 23, wherein the register does not impact or control any other functional features of the logic device.

25. An apparatus comprising:

a programming circuit to store in a register of a logic device an indication of an intended use of the logic device and to prevent any further programming of the register;

wherein the intended use includes at least one of an indication that the logic device is to be included in a board-level product and an indication that the logic device is to be sold individually.

26. The apparatus of claim 25, wherein the register does not impact or control any other functional features of the logic device.

27. An apparatus comprising:

a programming circuit to store in a register of a logic device an indication of an intended use of the logic device and to prevent any further programming of the register;

wherein the programming circuit is to store the indication using encryption.

28. The apparatus of claim 27, wherein the register is addressable as a read-only location using a peripheral input/output channel structure.

29. The apparatus of claim 27, wherein the programming circuit is implemented in software.

30. The apparatus of claim 27, wherein the register does not impact or control any other functional features of the logic device.

* * * * *